(12) United States Patent  (10) Patent No.: US 9,213,574 B2
Faruquie et al.  (45) Date of Patent: Dec. 15, 2015

(54) RESOURCES MANAGEMENT IN DISTRIBUTED COMPUTING ENVIRONMENT

(75) Inventors: Tanveer A Faruquie, New Delhi (IN); Hima P Karanam, New Delhi (IN); Mukesh K Mohania, Agra (IN); L Venkata Subramaniam, Gurgaon (IN); Girish Venkatachaliah, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1017 days.

(21) Appl. No.: 12/697,228

(22) Filed: Jan. 30, 2010

(65) Prior Publication Data

US 2011/0191781 A1  Aug. 4, 2011

(51) Int. Cl.
*G06F 9/46* (2006.01)
*G06F 9/50* (2006.01)

(52) U.S. Cl.
CPC ........................................ *G06F 9/50* (2013.01)

(58) Field of Classification Search
None
See application file for complete search history.

(56) References Cited

U.S. PATENT DOCUMENTS

| 5,349,682 | A | 9/1994 | Rosenberry |
| 5,357,632 | A | 10/1994 | Pian et al. |
| 6,098,091 | A | 8/2000 | Kisor |
| 7,065,764 | B1 * | 6/2006 | Prael et al. ..................... 718/102 |
| 7,536,373 | B2 | 5/2009 | Kelkar et al. |
| 8,621,476 | B2 * | 12/2013 | Youn et al. ..................... 718/104 |
| 2002/0016811 | A1 * | 2/2002 | Gall et al. ..................... 709/102 |
| 2002/0087694 | A1 * | 7/2002 | Daoud et al. .................. 709/226 |
| 2005/0060608 | A1 | 3/2005 | Marchand |
| 2006/0230149 | A1 * | 10/2006 | Jackson ........................ 709/226 |
| 2008/0320482 | A1 * | 12/2008 | Dawson et al. ................ 718/104 |
| 2009/0064151 | A1 | 3/2009 | Agarwal et al. |
| 2009/0119396 | A1 | 5/2009 | Kanda |
| 2009/0165007 | A1 | 6/2009 | Aghajanyan |

FOREIGN PATENT DOCUMENTS

WO  WO 01/90903 A1 * 11/2001

OTHER PUBLICATIONS

Orduna, et al., "A New Task Mapping Technique for Communication-Aware Scheduling Strategies," ICPPW, Spain, 2001 Intl Conf on Parallel Proc Wkshps, pp. 349-354.

(Continued)

*Primary Examiner* — Abdullah Al Kawsar
(74) *Attorney, Agent, or Firm* — Kali Law Group, P. C.

(57) ABSTRACT

A method, system and a computer program product for determining resources allocation in a distributed computing environment. An embodiment may include identifying resources in a distributed computing environment, computing provisioning parameters, computing configuration parameters and quantifying service parameters in response to a set of service level agreements (SLA). The embodiment may further include iteratively computing a completion time required for completion of the assigned task and a cost. Embodiments may further include computing an optimal resources configuration and computing at least one of an optimal completion time and an optimal cost corresponding to the optimal resources configuration. Embodiments may further include dynamically modifying the optimal resources configuration in response to at least one change in at least one of provisioning parameters, computing parameters and quantifying service parameters.

21 Claims, 7 Drawing Sheets

(56) References Cited

OTHER PUBLICATIONS

Yang, et al., "A Network Bandwidth-Aware Job Scheduling with Dynamic Information Model for Grid Resource Brokers," APSCC Taiwan, 2008 IEEE Asia-Pacific Services Computing Conference, pp. 775-780.

* cited by examiner

RESOURCES MANAGEMENT IN DISTRIBUTED COMPUTING ENVIRONMENT

BACKGROUND

With the advent of the Internet and rapid advances in network technologies, distributed computing has become an increasingly popular computing approach as it allows sharing of computational resources (such as, for example, memory, processing time, input/output, etc.) among many different users or systems or any combination thereof. One such example is "cloud computing", which involves applying the resources of several computers in a network to a single problem at the same time. Cloud computing is Internet ("cloud") based development and use of computer technology ("computing"). Conceptually, infrastructure details are abstracted from the users and/or systems that no longer need knowledge of, expertise in, or control over the technology infrastructure "in the cloud" that support them. It typically involves the provision of dynamically scalable and often virtualized resources as a service over the Internet.

Recently technologies such as, "grid computing", "utility computing" and "autonomic computing" have been used for sharing resources in a distributed computing environment. Grid computing is a form of distributed computing, whereby a 'super and virtual computer' is composed of a cluster of networked, loosely coupled computers acting in concert to perform large tasks. Utility computing is a packaging of computing resources, such as computation and storage, as a metered service similar to a traditional public utility, such as electricity. Autonomic computing is a computer system capable of self-management.

SUMMARY

Embodiments of the invention are directed to a method, system and computer program product for determining resources allocation in a distributed computing environment by identifying resources in a distributed computing environment, wherein each of the resources is capable of performing at least a part of an assigned task and computing an optimal resources configuration using a set of pre-determined parameters including at least a target completion time to complete the assigned task.

BRIEF DESCRIPTION OF THE DRAWINGS

Embodiments of the invention are described in detail below, by way of example only, with reference to the following schematic drawings, where.

DETAILED DESCRIPTION OF THE INVENTION

Distributed computing environments, such as, for example—Cloud computing, (also Grid computing and a service-oriented architecture [SOA]), uses a concept of service level agreements (SLA) to control the use and receipt of (computing) resources from and by third parties. Any SLA management strategy considers two well-differentiated phases: the negotiation of the contract and the monitoring of its fulfillment in run-time. Thus, SLA Management encompasses the SLA contract definition (basic schema with the QoS (quality of service) parameters), SLA negotiation, SLA monitoring, and SLA enforcement, according to defined policies. It is desirable to create a mechanism for a cloud, a grid or an SOA middleware, to manage providers and consumers of services. Indeed, many cloud computing deployments depend on grids, have autonomic characteristics, and bill like utilities, but cloud computing tends to expand what is provided by grids and utilities. Some successful cloud architectures have little or no centralized infrastructure or billing systems whatsoever, including peer-to-peer networks.

Compliance with the SLA, optimal resources utilization and completing assigned tasks in minimal costs are some of the important factors that are considered in distributed computing environment management. In prior art, a method discusses allocation of tasks in a multiprocessor environment in which, blocks of data are partitioned into tasks to be allocated to different processors. Another method in prior art discusses managing a system of computers connected via a network. Yet another method in prior art discloses a use of a master unit distributing a given computational task among slave units in a parallel computing environment. These methods that use "partitioning" techniques in general.

Another set of methods in prior art use task scheduling technique. Some other methods in this set also use historical data to predict workload in time and try to align resources to those projected needs.

Yet another set of methods in prior art use thread scheduling and replication based methods. The methods discuss transferring and replicating data among distributed resources to achieve workload distribution, wherein replicated data files are maintained and job processes are synchronized across the network.

A methodology that computes optimal provisioning of resources in a distributed computing environment along with SLA pricing, task completion time aspects with respect to the SLA and taking network failures into consideration, thereby offering a more flexible and dynamic optimization is desirable.

Figure 1:
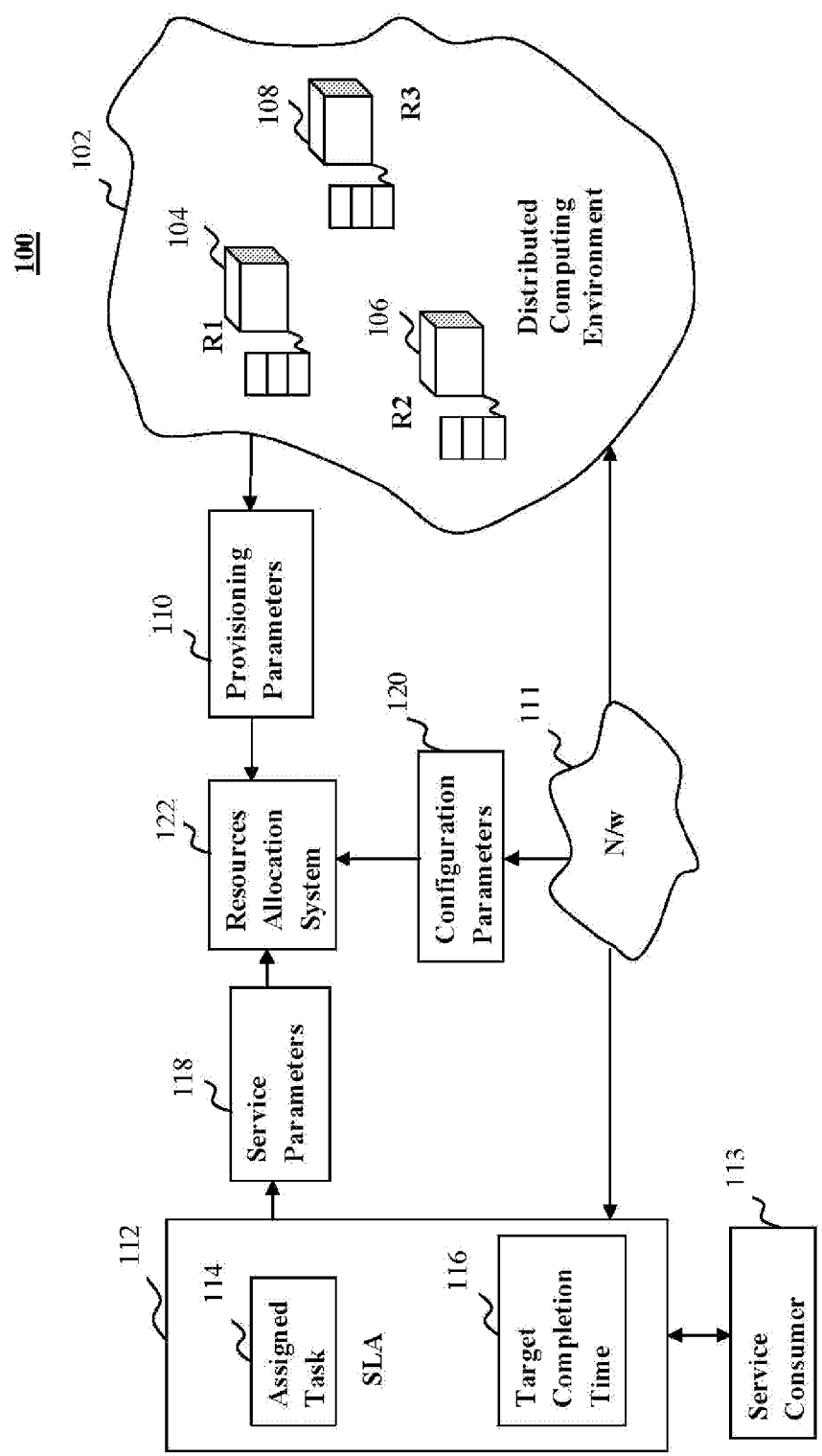
FIG. 1 shows a schematic of a system of determining resources allocation in a distributed computing environment in accordance with an embodiment of the invention.

FIG. 1 shows a schematic of a system 100 of determining resources allocation in a distributed computing environment in accordance with an embodiment of the invention. System 100 includes at least one processor and at least one memory.

FIG. 1 schematic depicts cloud 102 as an exemplary distributed computing environment coupled to an exemplary SLA 112 over a network 111. FIG. 1 also shows a service consumer 113 of the distributed computing environment service coupled to the exemplary SLA and a resources allocation system 122 coupled to the cloud (hereafter also referred to as distributed computing environment) 102 and the SLA 112, in accordance with an embodiment of the invention. Service consumer 113 is connected to distributed computing environment 102 via a network 111. SLA 112 is a layer between service consumer 113 and distributed computing environment 102. Two exemplary parameters, an assigned task 114 and a target completion time 116, are shown as part of SLA 112. Based on SLA 112, service parameters 118 are identified and quantified. Based on the quantification and computations related to network 111 for sample transactions between distributed computing environment 102 and pre-defined quantum of assigned tasks from service consumer 113, configuration parameters 120 are identified. Distributed computing environment 102 depicts exemplary resources R1 104, R2 106 and R3 108. It should be obvious to a person skilled in the art that more than or less than three resources can be used. Type and services provided by these resources may be similar or different.

In an exemplary mode, to quantify the network transfer speed, a connection could be established between a resource in distributed computing environment 102 and service consumer 113 and a fixed number of records may be transferred multiple times to obtain an average of data transfer rate achieved per record. As another example, to measure reliability of network transfer, an evaluation of historic failures over a pre-defined period of time could be undertaken. To measure a processing time for a particular assigned task, a table could be computed for number of records that can be processed with a given configuration of a combination of resources (e.g. R1 104, R2 106 etc.) from distributed computing environment 102.

Based on various properties of the resources of distributed computing environment 102, a set of provisioning parameters 110 are identified and computed. Resources allocation system 122 uses service parameters 118, configuration parameters 120 and provisioning parameters 110 and computes optimal resources allocation.

Figure 2:
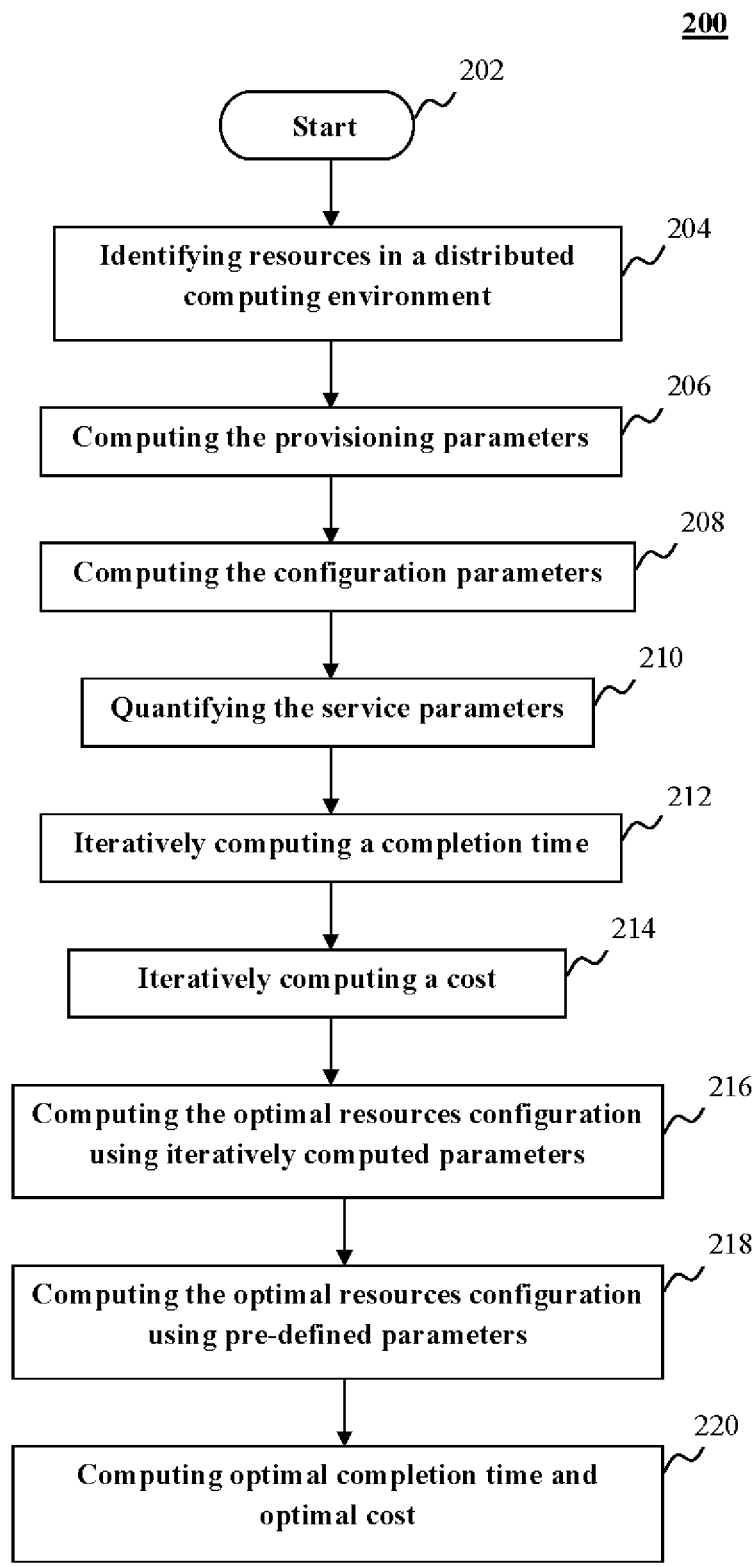
FIG. 2 shows a flowchart for determining an optimal resources allocation in a distributed computing environment in accordance with an embodiment of the invention.

FIG. 2 shows a flowchart of a method 200 for determining an optimal resources allocation in a distributed computing environment in accordance with an embodiment of the invention.

Step 202 depicts the start of the method 200. Step 204 shows identifying resources in a distributed computing environment, wherein each of the resources is capable of performing at least a part of an assigned task. The assigned task 114 of FIG. 1, in an exemplary mode, is processing of certain number of rows from a service consumer 113 (FIG. 1) and the processing could be performed using some optimal resources configuration on the distributed computing environment 102 (FIG. 1). Computing of the optimal resources configuration may use a set of pre-determined parameters including at least a target completion time 116 (FIG. 1), to complete the assigned task 114. The set of pre-determined parameters further include provisioning parameters 110 (FIG. 1), configuration parameters 120 (FIG. 1), and service parameters 118 (FIG. 1), wherein the service parameters 118 include at least one of a number of records to be processed and an amount of data to be processed. The provisioning parameters 110 include at least one of a CPU resource, a hard disk resource and a memory resource. The configuration parameters 120 include at least one of a bandwidth, a network speed, a network failure rate, and a probability distribution of network failure. Step 206 depicts computing provisioning parameters 110 corresponding to distributed computing environment 102. Step 208 depicts computing configuration parameters 120 corresponding to distributed computing environment 102. Step 210 shows quantifying service parameters 118 in response to a set of service level agreements (SLA) 112 (FIG. 1), wherein SLA 112 is corresponding to assigned task 114. Step 212 depicts iteratively computing a completion time required for completion of the assigned task 114 using at least one from a set of the computed provisioning parameters, the computed configuration parameters, and the quantified service parameters. Step 214 depicts iteratively computing a cost using at least one from a set of the computed provisioning parameters, the computed configuration parameters, the iteratively computed completion time required for completion of assigned task 114, target completion time 116 and the quantified service parameters. Step 216 depicts computing the optimal resources configuration using at least one from a set of the iteratively computed cost, the iteratively computed completion time required for completion of assigned task 114, and target completion time 116. Step 218 depicts computing an optimal resources configuration using a set of pre-determined parameters including at least target completion time 116 to complete assigned task 114. Step 220 depicts computing at least one of an optimal completion time required for completion of assigned task 114 corresponding to the optimal resources configuration and an optimal cost corresponding to the optimal resources configuration.

Figure 2A:
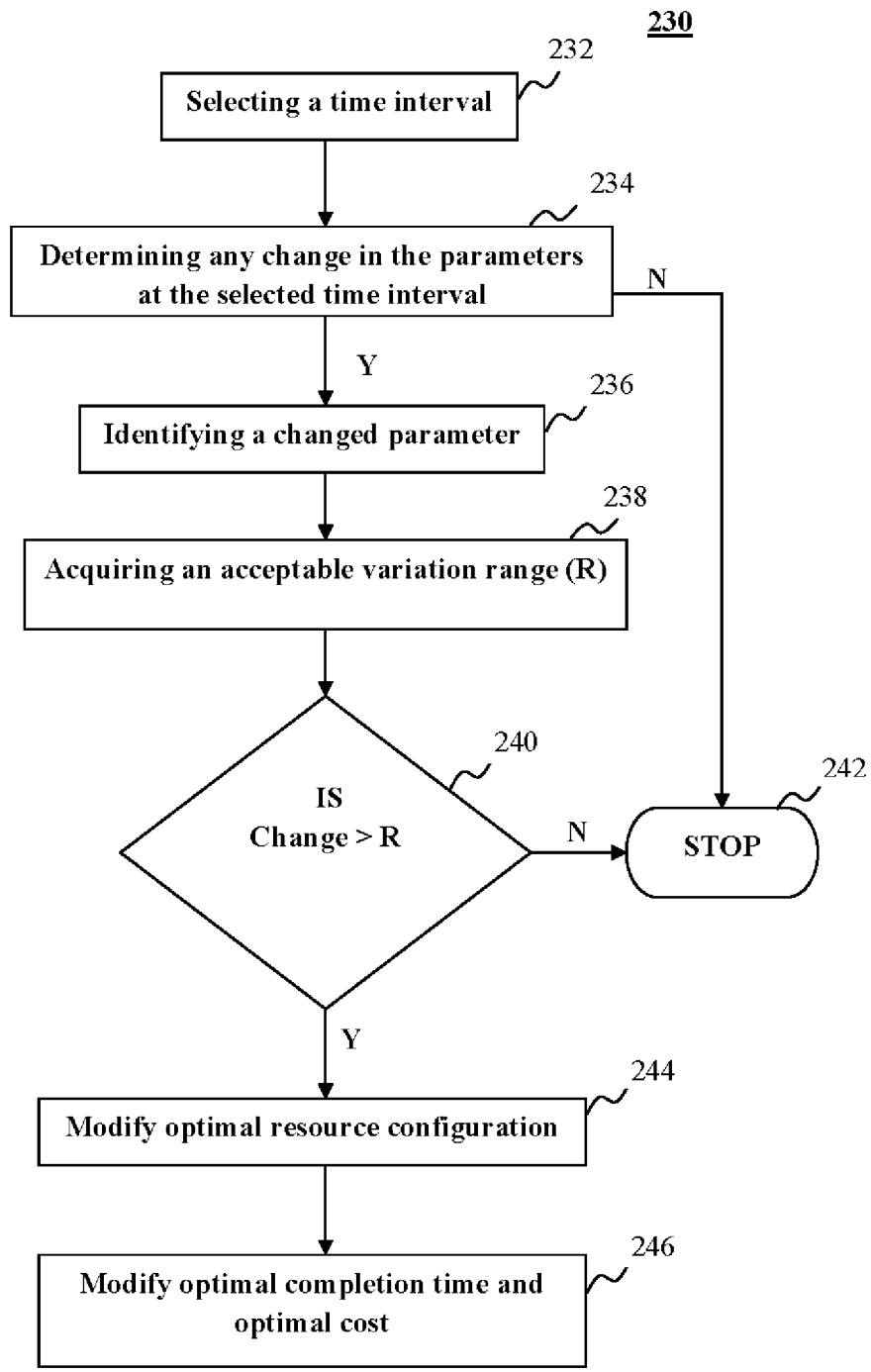
FIG. 2A shows a flowchart for dynamically determining an optimal resources allocation in a distributed computing environment for a time interval in accordance with an embodiment of the invention.

FIG. 2A shows a flowchart for a method 230 of dynamically determining an optimal resources allocation in a distributed computing environment for a time interval in accordance with an embodiment of the invention. Step 232 depicts selecting a time interval from a set of a manually defined time interval and a pre-determined time interval. Step 234 depicts determining, at the selected time interval, if there is at least one change in at least one from a set of the service parameters, the provisioning parameters and the configuration parameters. If there is no change, the method 230 ends and that is depicted by a stop element 242. If there is the at least one change found, step 236 depicts identifying a changed parameter corresponding to the at least one change, and step 238 depicts acquiring a preset threshold range (R) for the changed parameter.

Decision block 240 determines if the at least one change is more than the preset threshold range (R) of the changed parameter. If the at least one change is less than or equal to the preset threshold range (R) of the changed parameter, method 230 ends and is depicted by stop element 242. If the at least one change is more than the preset threshold range (R) of the changed parameter, step 244 depicts modifying the optimal resources configuration in response to the at least one change, and step 246 depicts modifying at least one of the optimal completion time required for completion of the assigned task and the optimal cost, wherein the modification is performed using the modified optimal resources configuration.

Figure 2B:
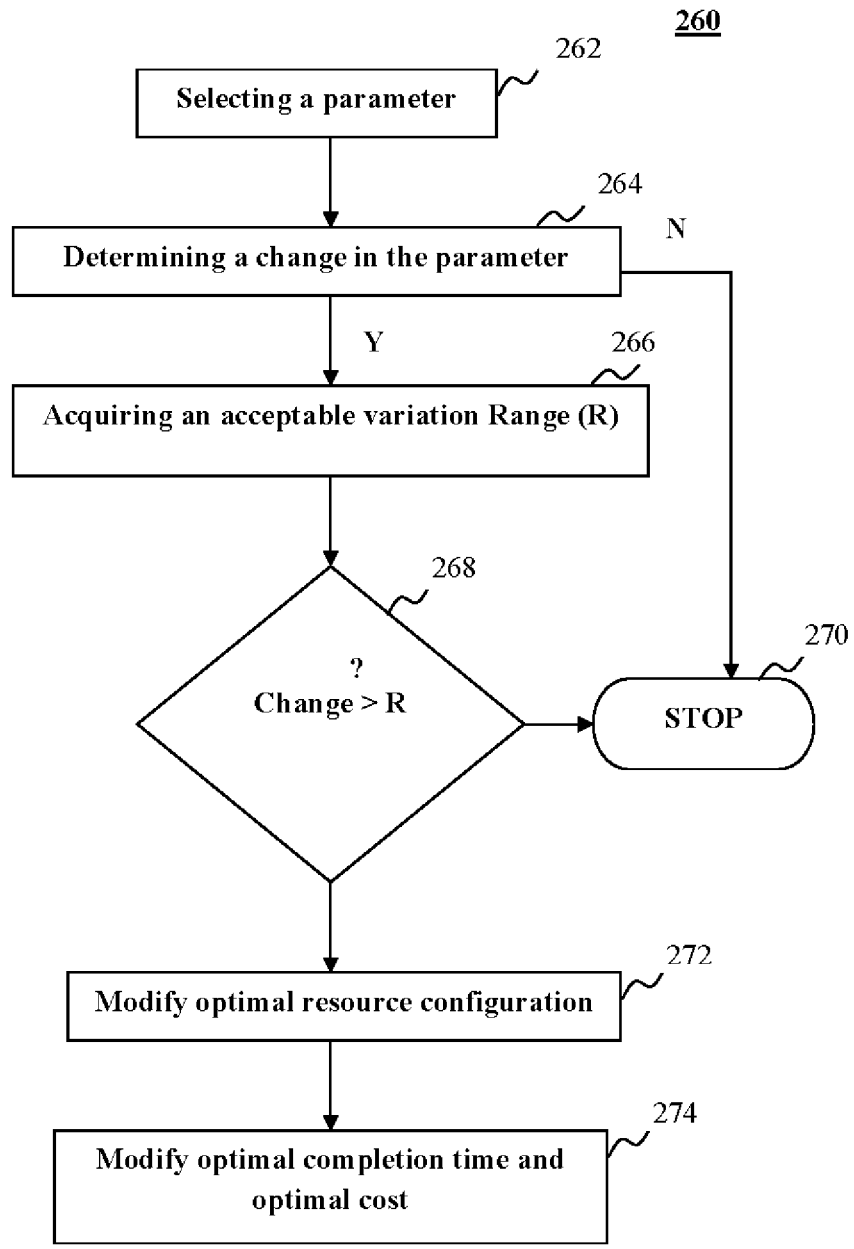
FIG. 2B shows a flowchart for dynamically determining an optimal resources allocation in a distributed computing environment responsive to a parameter change in accordance with an embodiment of the invention.

FIG. 2B shows a flowchart for a method 260 of dynamically determining an optimal resources allocation in a distributed computing environment responsive to a parameter change in accordance with an embodiment of the invention. Step 262 depicts selecting at least one parameter from a set of the service parameters, the provisioning parameters and the configuration parameters. Step 264 depicts determining if there is a change in the at least one selected parameter. If there is no change, method 260 ends and is depicted by stop element 270. If there is the change, step 266 depicts acquiring a preset threshold range (R) for the selected parameter and decision block 268 depicts evaluating if the change is more than the preset threshold range (R) of the selected parameter. If the change is less than or equal to the preset threshold range (R) of the selected parameter, method ends and is depicted by stop element 270. If the change is more than the preset threshold range (R) of the selected parameter, step 272 depicts modifying the optimal resources configuration in response to the at least one change, and step 274 modifying at least one of the optimal completion time required for completion of the assigned task and the optimal cost, wherein the modification is performed using the modified optimal resources configuration.

Figure 3:
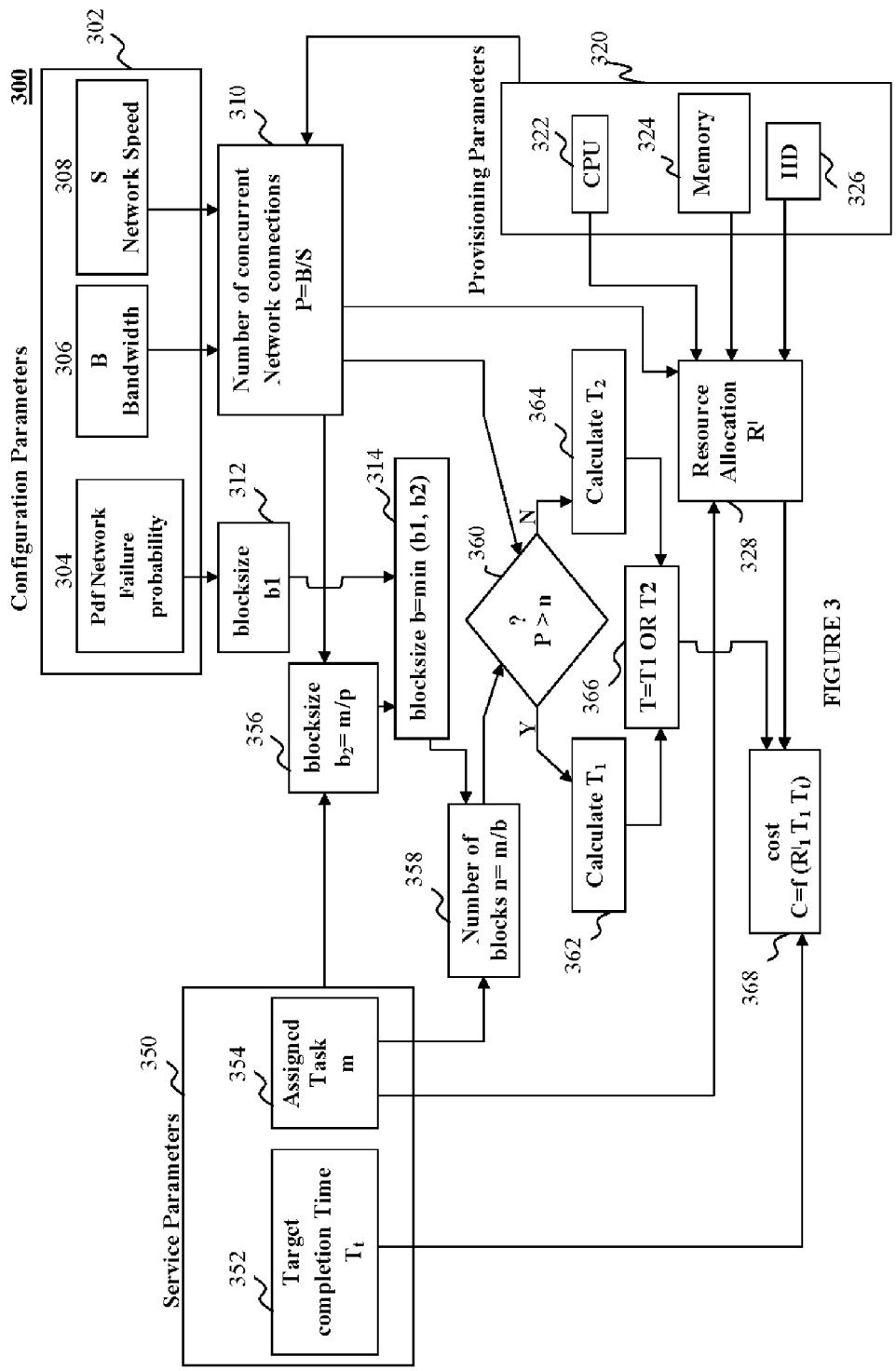
FIG. 3 shows a schematic illustrating details of some steps from the flowchart of FIG. 2 and some elements of FIG. 1, according to an example embodiment of the invention.

FIG. 3 shows a schematic 300 illustrating details of some steps from the flowchart of method 200 of FIG. 2 and some elements of FIG. 1, according to an example embodiment of the invention.

To describe elements of FIG. 3, some exemplary parameters are described as follows. Record fetch time (k), is average time to fetch one record from service consumer 113 of FIG. 1 to cloud 102 of FIG. 1. Connection speed (S), is an average connection speed computed as: S=sum (si)/n, where 'si' is network speed at time t=i, and an average of speeds 'si' is taken over all times ranging from t=1 to t=n. Network Failure Probability [Pdf(t)], is the probability that a network will fail in a particular time-interval t. There may be a finite time (Tco), a time taken to establish a connection to a resource. Assigned task (M), could be the total number of data records to be cleaned. Bandwidth (B), could be the minimum bandwidth on the distributed computing environment 102 side or the service consumer 113 side. Processing speed (q), may be the number of records that can be processed in one second. This typically includes all the records processed on all the instances. i.e., the number of CPUs and memory that are allocated for each machine instance and the number of such instances to be allocated. Some intermediate parameters are the number of concurrent connections (p) and a block size (b), which may be a number of records processed by single connection. Some of the target parameters could be completion time (T), a time taken to service the data processing request and cost (C), which may be a cost of resources needed to complete assigned task 114.

Schematic 300 includes an exemplary set of configuration parameters 302, an exemplary set of provisioning parameters 320 and an exemplary set of service parameters 350. Set of configuration parameters 302 further includes a network failure probability [pdf(t)] 304, a bandwidth (B) 306 and a network speed (S) 308. Set of provisioning parameters 320 further includes a plurality of CPU, memory and Hard Disk (HD) and only an exemplary CPU 322, an exemplary memory 324 and an exemplary HD 326 is shown in FIG. 3. It should be obvious to one skilled in the art that a plurality of memory, CPU and HD is typically present in a distributed computing environment. Set of service parameters 350 further includes a target completion time Tt 352 (similar to 116 of FIG. 1) and an assigned task M 354 (similar to 114 of FIG. 1).

Based on the value of B 306 and network speed S 308, number of concurrent network connections p 310 is calculated as p=B/S. A first block size based on network failure probability pdf(t) 304 is computed as b1 312. Element 356 depicts computation of a second block size b2 based on assigned task M 354 and computed p 310 as b2=M/p. Element 314 depicts computing effective block size b 314 based on a first block size b1 and second block size b2. It is computed using b=min (b1, b2). A number of blocks based on assigned task M 354 and effective block size b 314 is computed as n 358. n 358 is computed using n=M/b. Element 360 depicts determining if number of concurrent network connections p 310 is more than number of blocks n 358. If number of concurrent network connections p 310 is more than number of blocks n 358, time required to complete assigned task M 354 is computed as T1 as shown in element 362. The computing of T1 is performed using T1=(Tco+(M/p(k+1/q))/Pdf[t]). If number of concurrent network connections p 310 is less than number of blocks n 358, time required to complete assigned task M 354 is computed as T2 as shown in element 364. The computing of T2 is performed using T2=n/b*(Tco+(M/p(k+1/q))/pdf[t]). Depending on if number of concurrent network connections p 310 is less than or more than number of blocks n 358, T 366, time required to complete assigned task M 354 is computed as either T1 or T2, shown as T=T1 or T2.

Element 328 depicts computation of resources allocation R' and uses exemplary CPU 322, exemplary memory 324, exemplary HD 326, number of concurrent parameters p 310, and assigned task M 354. Computed resources allocation R' 328, computed time required to complete assigned task M 354 T 366, and target completion time Tt 352 are used to compute cost C 368, cost of utilizing resources in distributed computing environment 102 to complete assigned task M 354 within constraint of target completion time Tt 352.

Five exemplary cases are now discussed for computing T 366, time required to complete assigned task M 354.

Case 1: Infinite Bandwidth, Infinite Processing Speed
 B~infinite, q~infinite, Pdf[t]~0
 Open M concurrent connections for each record
  Time taken to clean M records is T=(Tco+k)
Case 2: Infinite Bandwidth, Finite Processing Speed
 B~inf, Pdf[t]~0
 Opening M concurrent connections for each record to fetch all records simultaneously will not help since only q records can be processed in one second. Therefore open q connection concurrently to fetch q records per second.
 Block size b=M/q
  Time taken to clean M records is T=(Tco+(M/q)(k+1))
Case 3: Finite Bandwidth, infinite Processing Speed
 q~inf, Pdf[t]~0
 Number of connections p=B/S,
  where B=min(B distributed computing environment, B service consumer)
 Open p connection concurrently to fetch p records per second (maximum that can be fetched)
 Block size b=M/p
  Time taken to clean M records is T=(Tco+(M/p)k)
Case 4: Finite Bandwidth, Finite Processing Speed
 Pdf[t]~0
 Open min(p,q) connections concurrently to fetch q records per second
 Block size b=M/min(p,q)
  Time taken to clean M records is T=(Tco+(M/min(p,q)(k+1/q))
Case 5: Finite Bandwidth, Finite Processing Speed
 The finite probability of network failure for a interval t is given by pdf[t]
 For a block size b, time taken to transfer the block is t'=(Tco+kb+b/q)
 The effective time T with failures is given by $$T = t'pdf(t') + (1-pdf[t])(2t'pdf[t'] + (1-pdf[t'])(3t'pdf[t'] \ldots ))$$

$$T = t'/pdf[t']$$

Figure 4:
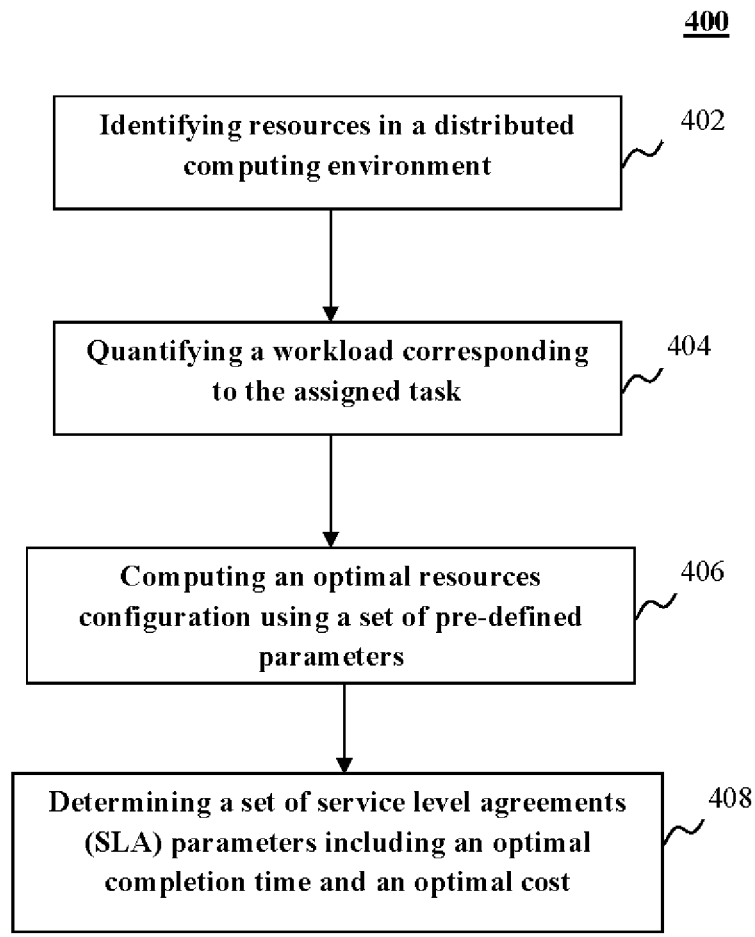
FIG. 4 shows a flowchart for determining resources allocation and determining a set of service level agreements (SLA) parameters as disclosed in one embodiment of the invention.

FIG. 4 shows a flowchart for a method 400 for determining resources allocation and determining a set of service level agreements (SLA) parameters as disclosed in one embodiment of the invention. Step 402 depicts identifying resources in a distributed computing environment 102 of FIG. 1, wherein each of the resources is capable of performing at least a part of assigned task 114 of FIG. 1. Step 404 depicts quantifying a workload corresponding to assigned task 114. The workload includes at least one of a number of records to be processed and an amount of data to be processed. Step 406 depicts computing an optimal resources configuration using a set of pre-defined parameters. The set of pre-determined parameters includes the quantified workload and at least one from a set including provisioning parameters 320 of FIG. 3 and configuration parameters 302 of FIG. 3. The provisioning parameters 320 include at least one of a CPU resource 322 of FIG. 3, a hard disk resource 326 of FIG. 3 and a memory resource 324 of FIG. 3. The configuration parameters 302 of FIG. 3 comprise at least one of a bandwidth B 306 of FIG. 3, a network speed S 308 of FIG. 3, a network failure rate, and a probability distribution of network failure pdf 304 of FIG. 3. Step 408 depicts determining a set of service level agreements (SLA, 112 of FIG. 1) parameters corresponding to assigned task 114 of FIG. 1, wherein the set of SLA 112 parameters includes at least one of an optimal completion time and an optimal cost. The optimal completion time is a time required to complete assigned task 112 using the optimal resources configuration, and the optimal cost is a cost corresponding to the optimal resources configuration.

Figure 5:
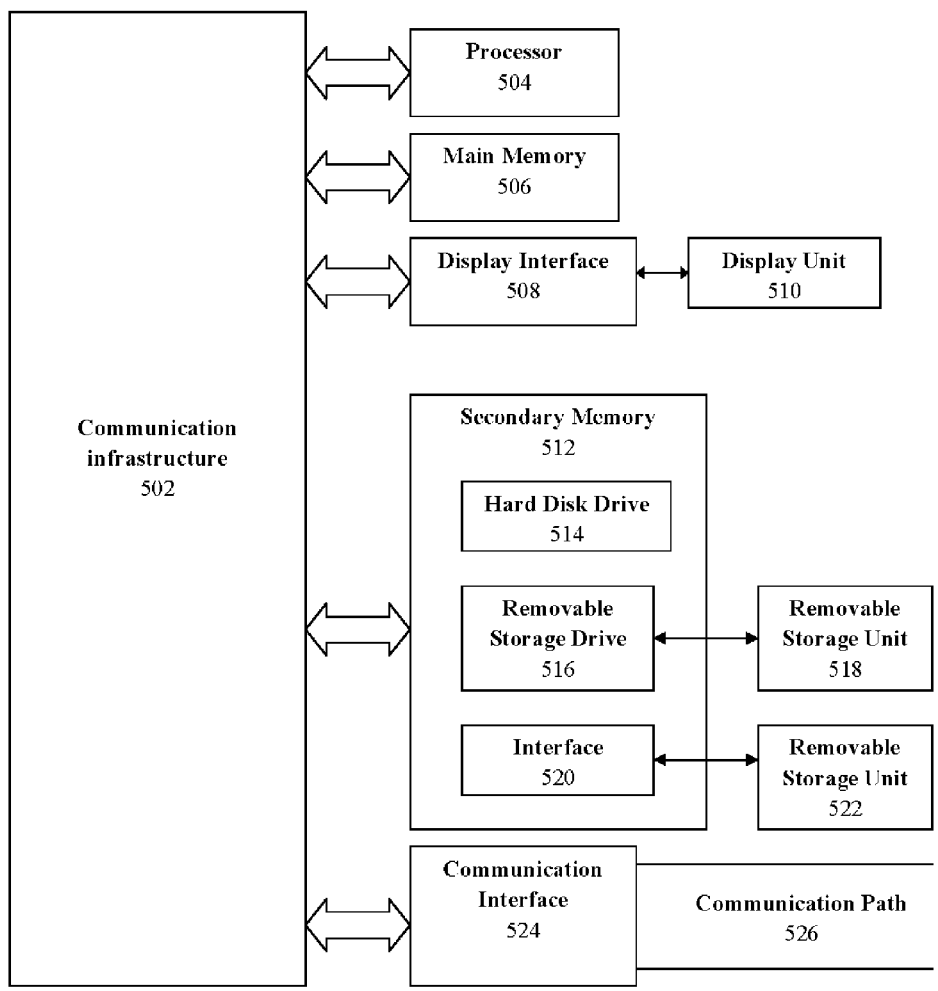
FIG. 5 shows a detailed schematic of a computer system used for determining resources allocation as disclosed in FIG. 1.

FIG. 5 is a block diagram of an exemplary computer system 500 that can be used for implementing various embodiments of the present invention. In some embodiments, the computer system 500 can be used as a system executing schematics of either FIG. 1 or FIG. 3 or a combination thereof. The computer system 500 can also be used to perform the steps described in any one or more of FIG. 2, FIG. 2A, FIG. 2B or FIG. 4. The Computer system 500 includes a processor 504. It should be understood although FIG. 5 illustrates a single processor, one skilled in the art would appreciate that more than one processor can be included as needed. The processor 504 is connected to a communication infrastructure 502 (for example, a communications bus, cross-over bar, or network) where the communication infrastructure 504 is configured to facilitate communication between various elements of the exemplary computer system 500. Various software embodiments are described in terms of this exemplary computer system. After reading this description, it will become apparent to a person of ordinary skill in the relevant art(s) how to implement the invention using other computer systems and/or computer architectures.

Exemplary computer system 500 can include a display interface 508 configured to forward graphics, text, and other data from the communication infrastructure 502 (or from a frame buffer not shown) for display on a display unit 510. The computer system 500 also includes a main memory 506, which can be random access memory (RAM), and may also include a secondary memory 512. The secondary memory 512 may include, for example, a hard disk drive 514 and/or a removable storage drive 516, representing a floppy disk drive, a magnetic tape drive, an optical disk drive, etc. The removable storage drive 516 reads from and/or writes to a removable storage unit 518 in a manner well known to those having ordinary skill in the art. The removable storage unit 518, represents, for example, a floppy disk, magnetic tape, optical disk, etc. which is read by and written to by the removable storage drive 516. As will be appreciated, the removable storage unit 518 includes a computer usable storage medium having stored therein computer software and/or data.

In exemplary embodiments, the secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to the computer system 500.

The computer system 500 may also include a communications interface 524. The communications interface 524 allows software and data to be transferred between the computer system and external devices. Examples of the communications interface 524 may include a modem, a network interface (such as an Ethernet card), a communications port, a PCM-CIA slot and card, etc. Software and data transferred via the communications interface 524 are in the form of signals which may be, for example, electronic, electromagnetic, optical, or other signals capable of being received by communications interface 524. These signals are provided to the communications interface 524 via a communications path (that is, channel) 526. The channel 526 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as the main memory 506 and the secondary memory 512, the removable storage drive 516, a hard disk installed in the hard disk drive 514, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, that allows a computer to read such computer readable information.

Computer programs (also referred to herein as computer control logic) are stored in the main memory 506 and/or the secondary memory 512. Computer programs may also be received via the communications interface 524. Such computer programs, when executed, can enable the computer system to perform the features of exemplary embodiments of the present invention as discussed herein. In particular, the computer programs, when executed, enable the processor 504 to perform the features of the computer system 500. Accordingly, such computer programs represent controllers of the computer system.

Embodiments of the invention further provide a storage medium tangibly embodying a program of machine-readable instructions executable by a digital processing apparatus to carry out a method of determining resources allocation in a distributed computing environment as described in the various embodiments set forth above and described in detail.

Advantages of various embodiments of the invention include effective resources provisioning and pricing for determining and meeting the SLA for multiple tasks including data processing using cloud computing. Advantages of various embodiments of the invention further include increased reliability in meeting the requirements of a client within reasonably accurate budgetary and manpower and hardware constraints.

The described techniques may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

What is claimed is:

1. A computer implemented method for determining resources allocation for fulfilling service level agreements (SLA) to a service consumer, the method comprising:
    identifying resources in a distributed computing environment over a network, wherein each of the resources is capable of performing at least a part of an assigned task;
    computing an optimal resources configuration of the identified resources using each of a set of pre-determined parameters including,
        at least a target completion time interval in which to complete the assigned task,
        provisioning parameters based on a plurality of properties of the resources in the distributed computing environment,
        configuration parameters based on quantification and computations related to the network for a plurality of sample transactions between the distributed computing environment and a plurality of pre-defined quanta of assigned tasks from a service consumer, and
        service parameters, wherein the service parameters include at least one of a number of records to be processed and an amount of data to be processed, and wherein the SLA is a layer between the distributed computing environment and the service consumer;
    selecting a time interval from at least one of a manually defined time interval and a pre-determined time interval; and
    determining, at the selected time interval, if there is at least one change in at least one of the service parameters, the provisioning parameters and the configuration parameters; and if the at least one change occurs:
identifying a changed parameter corresponding to the at least one change, wherein the changed parameter corresponds with one of the service parameters, the provisioning parameters and the configuration parameters; and
acquiring a preset threshold range for the changed parameter;
if the at least one change is greater than the preset threshold range of the changed parameter:
modifying the optimal resources configuration in response to the at least one change;
modifying at least one of a computed optimal completion time interval required for completion of the assigned task and a computed optimal cost, wherein the modification is performed using a modified optimal resources configuration; and
performing the assigned task execution utilizing the modified optimal resources configuration.

2. The method of claim 1, wherein the provisioning parameters comprise at least one of a CPU resource, a hard disk resource and a memory resource.

3. The method of claim 1, wherein the configuration parameters comprise at least one of a bandwidth, a network speed, a network failure rate, and a probability distribution of network failure.

4. The method of claim 1, further comprising:
computing the provisioning parameters corresponding to the distributed computing environment;
computing the configuration parameters corresponding to the distributed computing environment; and
quantifying the service parameters in response to a set of SLA, wherein the set of SLA is corresponding to the assigned task.

5. The method of claim 4, further comprising:
iteratively computing a completion time interval required for completion of the assigned task wherein each iteration uses at least one of the computed provisioning parameters, the computed configuration parameters, and the quantified service parameters.

6. The method of claim 5, further comprising:
iteratively computing a cost, wherein each iteration uses at least one of the computed provisioning parameters, the computed configuration parameters, the iteratively computed completion time interval required for completion of the assigned task, the target completion time interval and the quantified service parameters; and
computing the optimal resources configuration using at least one of the iteratively computed cost, the iteratively computed completion time interval required for completion of the assigned task, and the target completion time interval.

7. The method of claim 6, further comprising:
computing an optimal completion time interval required for completion of the assigned task corresponding to the optimal resources configuration and an optimal cost corresponding to the optimal resources configuration.

8. The method of claim 7, further comprising:
selecting at least one of the service parameters, the provisioning parameters and the configuration parameters; and
determining if there is a change in the at least one selected parameter;

if the change occurs:
acquiring a preset threshold range for the selected parameter;
if the change is more than the preset threshold range of the selected parameter:
modifying the optimal resources configuration in response to the at least one change; and
modifying at least one of the optimal completion time interval required for completion of the assigned task and the optimal cost, wherein the modification is performed using the modified optimal resources configuration.

9. A method for determining resources allocation for fulfilling service level agreements (SLA) to a service consumer, the method comprising:
identifying resources in a distributed computing environment over a network, wherein each of the resources is capable of performing at least a part of an assigned task;
quantifying a workload corresponding to the assigned task;
computing an optimal resources configuration for the identified resources using each of a set of pre-defined parameters including,
at least a target completion time interval in which to complete the assigned task,
provisioning parameters based on a plurality of properties of the resources in the distributed computing environment,
configuration parameters based on quantification and computations related to the network for a plurality of sample transactions between the distributed computing environment and a plurality of pre-defined quanta of assigned tasks from a service consumer, and
service parameters, wherein the service parameters include at least one of a number of records to be processed and an amount of data to be processed, and wherein the SLA is a layer between the distributed computing environment and the service consumer;
determining a set of SLA parameters corresponding to the assigned task, wherein the set of SLA parameters includes at least one of an optimal completion time interval and an optimal cost;
selecting a time interval from at least one of a manually defined time interval and a pre-determined time interval; and
determining, at the selected time interval, if there is at least one change in at least one of the service parameters, the provisioning parameters and the configuration parameters;
if the at least one change occurs:
identifying a changed parameter corresponding to the at least one change, wherein the changed parameter corresponds with one of the service parameters, the provisioning parameters and the configuration parameters; and
acquiring a preset threshold range for the changed parameter;
if the at least one change is greater than the preset threshold range of the changed parameter: modifying the optimal resources configuration in response to the at least one change;
modifying at least one of a computed optimal completion time interval required for completion of the assigned task and a computed optimal cost, wherein the modification is performed using a modified optimal resources configuration; and
performing the assigned task execution utilizing the modified optimal resources configuration.

10. The method of claim 9, wherein the workload comprises at least one of a number of records to be processed and an amount of data to be processed.

11. The method of claim 9, wherein:
the set of pre-determined parameters includes the quantified workload and at least one of provisioning parameters and configuration parameters;
the optimal completion time interval is a time interval required to complete the assigned task using the optimal resources configuration; and
the optimal cost is a cost corresponding to the optimal resources configuration.

12. The method of claim 11, wherein the provisioning parameters comprise at least one of a CPU resource, a hard disk resource and a memory resource.

13. The method of claim 11, wherein the configuration parameters comprise at least one of a bandwidth, a network speed, a network failure rate, and a probability distribution of network failure.

14. A system for determining resources allocation for fulfilling service level agreements (SLA) to a service consumer, the system comprising at least one processor and at least one memory, wherein the processor is configured to:
identify resources in a distributed computing environment over a network, wherein each of the resources is capable of performing at least a part of an assigned task;
compute an optimal resources configuration of the identified resources using each of a set of pre-determined parameters including, provisioning parameters based on a plurality of properties of the resources in the distributed computing environment, configuration parameters based on quantification and computations related to the network for a plurality of sample transactions between the distributed computing environment and a plurality of pre-defined quanta of assigned tasks from a service consumer, and service parameters, wherein the service parameters include a target completion time interval in which to complete the assigned task and at least one of a number of records to be processed and an amount of data to be processed, and wherein the SLA is a layer between the distributed computing environment and the service consumer;
select a time interval from at least one of a manually defined time interval and a pre-determined time interval; and
determine, at the selected time interval, if there is at least one change in at least one of the service parameters, the provisioning parameters and the configuration parameters;
if the at least one change occurs:
identify a changed parameter corresponding to the at least one change, wherein the changed parameter corresponds with one of the service parameters, the provisioning parameters and the configuration parameters; and
acquire a preset threshold range for the changed parameter;
if the at least one change is greater than the preset threshold range of the changed parameter:
modify the optimal resources configuration in response to the at least one change;
modify at least one of a computed optimal completion time interval required for completion of the assigned task and a computed optimal cost, wherein the modification is performed using a modified optimal resources configuration; and
performing the assigned task execution utilizing the modified optimal resources configuration.

15. The system of claim 14, the processor is further adapted to:
compute the provisioning parameters corresponding to the distributed computing environment, wherein the provisioning parameters include at least one of a CPU resource, a hard disk resource and a memory resource;
compute the configuration parameters corresponding to the distributed computing environment, wherein the configuration parameters include at least one of a bandwidth, a network speed, a network failure rate, and a probability distribution of network failure;
quantify the service parameters in response to a set of service level agreements (SLA) SLA, wherein the set of SLA is corresponding to the assigned task, and wherein the service parameters include a target completion time interval, and at least one of a number of records to be processed and an amount of data to be processed;
iteratively compute a completion time interval required for completion of the assigned task wherein each iteration uses at least one of the computed provisioning parameters, the computed configuration parameters, and the quantified service parameters;
iteratively compute a cost wherein each iteration uses at least one of the computed provisioning parameters, the computed configuration parameters, the iteratively computed completion time interval required for completion of the assigned task, the target completion time interval and the quantified service parameters; and
compute the optimal resources configuration using at least one of the iteratively computed cost, the iteratively computed completion time interval required for completion of the assigned task, and the target completion time interval.

16. The system of claim 15, the processor is further adapted to:
compute an optimal completion time interval required for completion of the assigned task corresponding to the optimal resources configuration and an optimal cost corresponding to the optimal resources configuration.

17. The system of claim 16, the processor is further adapted to:
select at least one of the service parameters, the provisioning parameters and the configuration parameters; and
determine if there is a change in the at least one selected parameter;
if the change occurs:
acquire a preset threshold range for the selected parameter;
if the change is more than the preset threshold range of the selected parameter:
modify the optimal resources configuration in response to the at least one change; and
modify at least one of the optimal completion time interval required for completion of the assigned task and the optimal cost, wherein the modification is performed using the modified optimal resources configuration.

18. A computer program product for determining resources allocation for fulfilling service level agreements (SLA) to a service consumer, the computer program product comprising a non-transitory computer readable storage medium having computer readable program code embodied therewith, the computer readable program code comprising machine-readable instructions executable by a digital processing apparatus to:
identify resources in a distributed computing environment over a network, wherein each of the resources is capable of performing at least a part of an assigned task; and compute an optimal resources configuration of the identified resources using each of a set of pre-determined parameters including, provisioning parameters based on a plurality of properties of the resources in the distributed computing environment, configuration parameters based on quantification and computations related to the network for a plurality of sample transactions between the distributed computing environment and a plurality of pre-defined quanta of assigned tasks from a service consumer, and service parameters, wherein the service parameters include a target completion time interval in which to complete the assigned task and at least one of a number of records to be processed and an amount of data to be processed, and wherein the SLA is a layer between the distributed computing environment and the service consumer;

select a time interval from at least one of a manually defined time interval and a pre-determined time interval; and determine, at the selected time interval, if there is at least one change in at least one of the service parameters, the provisioning parameters and the configuration parameters;

if the at least one change occurs:

identify a changed parameter corresponding to the at least one change, wherein the changed parameter corresponds with one of the service parameters, the provisioning parameters and the configuration parameters; and acquire a preset threshold range for the changed parameter;

if the at least one change is greater than the preset threshold range of the changed parameter:

modify the optimal resources configuration in response to the at least one change; modify at least one of a computed optimal completion time interval required for completion of the assigned task and a computed optimal cost, wherein the modification is performed using a modified optimal resources configuration; and performing the assigned task execution utilizing the modified optimal resources configuration.

19. The computer program product of claim 18, further configured to:

compute the provisioning parameters corresponding to the distributed computing environment, wherein the provisioning parameters include at least one of a CPU resource, a hard disk resource and a memory resource;

compute the configuration parameters corresponding to the distributed computing environment, wherein the configuration parameters include at least one of a bandwidth, a network speed, a network failure rate, and a probability distribution of network failure; quantify the service parameters in response to a set of SLA, wherein the set of SLA is corresponding to the assigned task, and wherein the service parameters include a target completion time interval, and at least one of a number of records to be processed and an amount of data to be processed;

iteratively compute a completion time interval required for completion of the assigned task, wherein each iteration uses at least one of the computed provisioning parameters, the computed configuration parameters, and the quantified service parameters;

iteratively compute a cost, wherein each iteration uses at least of the computed provisioning parameters, the computed configuration parameters, the computed completion time interval required for completion of the assigned task, the target completion time interval and the quantified service parameters; and compute the optimal resources configuration using at least one of the iteratively computed cost, the iteratively computed completion time interval required for completion of the assigned task, and the target completion time interval.

20. The computer program product of claim 19, further configured to:

compute an optimal completion time interval required for completion of the assigned task corresponding to the optimal resources configuration and an optimal cost corresponding to the optimal resources configuration.

21. The computer program product of claim 20, further configured to:

select at least one of the service parameters, the provisioning parameters and the configuration parameters; and determine if there is a change in the at least one selected parameter;

if the change occurs:

acquire a preset threshold range for the selected parameter;

if the change is more than the preset threshold range of the selected parameter:

modify the optimal resources configuration in response to the at least one change; and modify at least one of the optimal completion time interval required for completion of the assigned task and the optimal cost, wherein the modification is performed using the modified optimal resources configuration.

* * * * *